(12) United States Patent
Beust et al.

(10) Patent No.: US 7,546,579 B2
(45) Date of Patent: Jun. 9, 2009

(54) SYSTEMS AND METHODS FOR PLAIN OLD JAVA OBJECT (POJO) PERSISTENCE

(75) Inventors: Cédric Beust, San Francisco, CA (US); Seth White, San Francisco, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 655 days.

(21) Appl. No.: 10/927,336

(22) Filed: Aug. 26, 2004

(65) Prior Publication Data

US 2005/0262041 A1 Nov. 24, 2005

Related U.S. Application Data

(60) Provisional application No. 60/573,313, filed on May 21, 2004.

(51) Int. Cl.
*G06F 9/44* (2006.01)
*G06F 9/45* (2006.01)

(52) U.S. Cl. .................. 717/108; 717/116; 717/117; 717/118; 717/143; 717/146

(58) Field of Classification Search .............. 717/108
See application file for complete search history.

(56) References Cited

U.S. PATENT DOCUMENTS

| | | | | |
|---|---|---|---|---|
| 2004/0111701 | A1* | 6/2004 | Beust | 717/108 |
| 2004/0225995 | A1* | 11/2004 | Marvin et al. | 717/100 |
| 2005/0071810 | A1* | 3/2005 | Sutter et al. | 717/116 |
| 2006/0004831 | A1* | 1/2006 | Debertin et al. | 707/102 |

OTHER PUBLICATIONS

Walnes et al., Java Open Source Programming With XDoclet, JUnit, WebWork, Hibernate, Published by Wiley on Nov. 28, 2003, ISBN: 0471-46362-0, chapter 6 and 9, pp. 53-83 and 165-183.*

Walnes et al., Java Open Source Programming with XDoclet, Junit, WebWork, Hibernate, published by Wiley Publishing, Inc. Nov. 23, 2003, ISBN 0-471-46362-0, pp. 1-459.*

Cedric Beust, EJBGen An EJB 2.0 Code Generator, current version 2.11, last modified Jan. 23, 2002, pp. 1-29.*

Walnes, et al., "Java Open Source Programming with XDoclet, JUnit, WebWork, Hibernate", Wiley Publishing, Inc., Nov. 28, 2003, ISBN: 0-471-46362-0, pp. 53-82, 165-183 and 269-308.

* cited by examiner

*Primary Examiner*—Tuan Q Dam
*Assistant Examiner*—Zheng Wei
(74) *Attorney, Agent, or Firm*—Fliesler Meyer LLP

(57) ABSTRACT

The present invention uses annotations and SQL to retrieve and/or persist POJO data from/to a database, respectively. Using SQL will enable developers to unleash the full querying power of their chosen Database Management Systems (DBMS) and will remove the requirement that they learn a new query language. A minimal amount of annotations will be associated in the same Java® source file where each class of POJO to be persisted to the database is defined. An enhanced compiler is capable of analyzing the annotated source file and automatically generate the bytecode required to create, deploy, and manage the persistence of POJOs without requiring knowledge of specific details of the persistence to corresponding data entities in the underlining database. Therefore, such an approach decreases the time, knowledge, skill and ultimately cost required to persist POJOs to an underlying database. This description is not intended to be a complete description of, or limit the scope of, the invention. Other features, aspects, and objects of the invention can be obtained from a review of the specification, the figures, and the claims.

10 Claims, 7 Drawing Sheets

```
package weblogic.ejb30.annotations;

import java.lang.annotation.Target;
import java.lang.annotation.Retention;

@Retention(java.lang.annotation.RetentionPolicy.CLASS)
@Target(java.lang.annotation.ElementType.TYPE)
public @interface Persistent {

String primKeyClass();                                          301

String tableName() default "Unspecified";                       302 enum VerifyRows { Unspecified, Read, Modified };

VerifyRows verifyRows() default VerifyRows.Unspecified;         303

String defaultDbmsTablesDdl() default "Unspecified";

enum EntityTransactionAttribute { Unspecified, NotSupported, Supports, Required, RequiresNew, Mandatory,
    Never };

String optimisticColumn() default "Unspecified";                304 enum ValidateDBSchemaWith { Unspecified, MetaData, TableQuery };

ValidateDBSchemaWith validateDbSchemaWith() default ValidateDBSchemaWith.Unspecified;   305 enum EntityConcurrencyStrategy { Unspecified, ReadOnly, Exclusive, Database, Optimistic };

EntityConcurrencyStrategy concurrencyStrategy() default EntityConcurrencyStrategy.Unspecified;   306 enum VerifyColumns { Unspecified, Read, Modified, Version, Timestamp };

VerifyColumns verifyColumns() default VerifyColumns.Unspecified;   307

String transTimeoutSeconds() default "Unspecified";             308 enum DatabaseType { Unspecified, DB2, Informix, Oracle, SQLServer, Sybase,PointBase, SQLServer2000 };

DatabaseType databaseType() default DatabaseType.Unspecified;   309 enum DbIsShared { Unspecified, True, False };

DbIsShared dbIsShared() default DbIsShared.Unspecified;

enum EnableDynamicQueries { Unspecified, True, False };

EnableDynamicQueries enableDynamicQueries() default EnableDynamicQueries.Unspecified;   310

String dataSourceName() default "Unspecified";

String discriminatorColumn() default "Unspecified";             311
}
```

Figure 3

```
package weblogic.ejb30.annotations;

import java.lang.annotation.Target;
import java.lang.annotation.Retention;

@Retention(java.lang.annotation.RetentionPolicy.CLASS)
@Target(java.lang.annotation.ElementType.METHOD)
public @interface CmpField {

String column();                                                              401 enum CmpFieldReadOnlyInValueObject { Unspecified, True, False };

String tableName() default "Unspecified";                                     402

String[] groupNames() default "Unspecified";                                  403 enum ColumnType { Unspecified, OracleClob, OracleBlob };

ColumnType columnType() default ColumnType.Unspecified;

enum CmpFieldPrimkeyField { Unspecified, True, False };

CmpFieldPrimkeyField primkeyField() default CmpFieldPrimkeyField.Unspecified; 404
}
```

Figure 4

```
package weblogic.ejb30.annotations;

import java.lang.annotation.Target;
import java.lang.annotation.Retention;

@Retention(java.lang.annotation.RetentionPolicy.CLASS)
@Target(java.lang.annotation.ElementType.TYPE)
public @interface Relation {

String name();                                          501

String joinTable() default "Unspecified";               502

String[] fkColumns() default "Unspecified";             503

String foreignKeyTable() default "Unspecified";         504

String primaryKeyTable() default "Unspecified";         505

String[] cmrFields() default "Unspecified";             506 enum DBCascadeDelete { Unspecified, True, False };

DBCascadeDelete dbCascadeDelete() default DBCascadeDelete.Unspecified;

enum CascadeDelete { Unspecified, True, False };

CascadeDelete cascadeDelete() default CascadeDelete.Unspecified;

String targetEjb() default "Unspecified";               507

String id() default "Unspecified";
}
```

Figure 5

```
package weblogic.ejb30.annotations import java.lang.annotation.Target;
import java.lang.annotation.Retention;

@Retention(java.lang.annotation.RetentionPolicy.CLASS)
@Target(java.lang.annotation.ElementType.METHOD)
public @interface CmrField {

String[] groupNames() default "Unspecified";                601
}
```

Figure 6

```
package weblogic.ejb30.annotations;

import java.lang.annotation.Target;
import java.lang.annotation.Retention;

@Retention(java.lang.annotation.RetentionPolicy.CLASS)
@Target(java.lang.annotation.ElementType.TYPE)
public @interface RelationshipCachingElement {

String cachingName();                              701

String[] cmrField();                               702

String[] groupName() default "Unspecified";        703

String parentId() default "Unspecified";

String id() default "Unspecified";

SYSTEMS AND METHODS FOR PLAIN OLD JAVA OBJECT (POJO) PERSISTENCE

CLAIM OF PRIORITY

This application claims priority from the following application, which is hereby incorporated by reference in its entirety:

U.S. Provisional Patent Application No. 60/573,313, entitled SYSTEMS AND METHODS FOR PLAIN OLD JAVA OBJECT (POJO) PERSISTENCE by Cedric Beust and Seth White, filed May 21, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

This application is related to the following pending application which is hereby incorporated by reference in its entirety:

U.S. application Ser. No. 10/927,293 entitled SYSTEMS AND METHODS FOR PLAIN OLD JAVA OBJECT (POJO) RETRIEVAL, Inventors: Cedric Beust and Seth White, filed concurrently.

FIELD OF THE INVENTION

This invention relates to the field of retrieval and persistence of Java® objects.

BACKGROUND

A Java® object (instance) is a software component comprising data and functionality (methods) to manipulate the data in a Java® programming environment. It usually has a public default constructor and supports the setting and/or retrieving of all or a part of its data using so-called setter and getter methods, which are often named as: getXXX( ), setXXX( ) or isXXX( ), where XXX identifies the name of a part of its data. A Java® object may also be extended to include metadata, event, and other suitable contents to support application-oriented components, such as Enterprise Java® Bean, Applet, etc. A Plain Old Java® Object (POJO) is a generic kind of Java® object which, besides generic data operations such as setters and getters, does not use nor support the kinds of application-oriented elements described above. More specifically, it does not implement any lifecycle or events, it does not provide any kind of metadata.

The retrieval of data from a database to POJOs presents a set of problems. Here, the database can be a relational database, an object-oriented database, a DB2, an Informix Database, an Oracle Database, a SQL Server, a Sybase Database, a Point Base, and a SQL Server2000, and other suitable database. Many current approaches utilize a high-level query language, such as EJB-QL, which allows queries to be specified against a POJO class without requiring any knowledge of the underlying types of the databases. Such query languages, however, are often not as expressive as SQL, which deters users from using them to begin with. In addition, learning more than one query language and using them efficiently often proves to be difficult for many users.

The persistence of POJOs to a database presents a different set of problems. Due to its generic nature, it is difficult for a POJO to support persistence, i.e., the transfer (map) of data, to an underlying database. Current approaches try to solve this problem by inserting additional methods into the class (type) of POJO, modifying the functionalities of the existing methods in the class, or associating one or more additional descriptive files to specify how the persistence between the POJO and the database should proceed. Such approaches may suffer from several drawbacks:

They are "intrusive". Since additional methods are introduced and/or the existing methods are modified, the behavior of the POJO may be altered unintentionally.

They are hard to maintain. Organizing and keeping track of all the additional changes and files and making them consistent throughout the process without affecting the normal operation of the POJO can be very difficult and requires a lot of efforts from the users.

They are difficult to use. The additional method changes and files will put a heavy burden on the users, making the persistence of POJO a non-trivial and time consuming task.

BRIEF DESCRIPTION OF THE DRAWINGS

FIG. 3 illustrates an exemplary source code defining annotation @Persistent in accordance with one embodiment of the invention.

FIG. 4 illustrates an exemplary source code defining annotation @CmpField in accordance with one embodiment of the invention FIG. 5 illustrates an exemplary source code defining annotation @Relation in accordance with one embodiment of the invention.

FIG. 6 illustrates an exemplary source code defining annotation @CmrField in accordance with one embodiment of the invention.

FIG. 7 is an exemplary source code defining annotation @RelationshipCachingElement in accordance with one embodiment of the invention

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Embodiments of the present invention overcome the disadvantages listed above by using SQL to retrieve and annotations to persist POJO data from/to a database, respectively. Using SQL will enable developers to unleash the full querying power of their chosen Database Management Systems (DBMS) and will remove the requirement that they learn a new query language. A minimal amount of annotations will be associated in the same Java® source file where each class of POJO to be persisted to the database is defined. An enhanced compiler is capable of analyzing the annotated source file and automatically generates the bytecode required to create, deploy, and manage the persistence of POJOs without requiring knowledge of specific details of the persistence to corresponding data entities in the underlining database. Therefore, such an approach decreases the time, knowledge, skill and ultimately cost required to persist POJOs to an underlying database.

Figure 1:
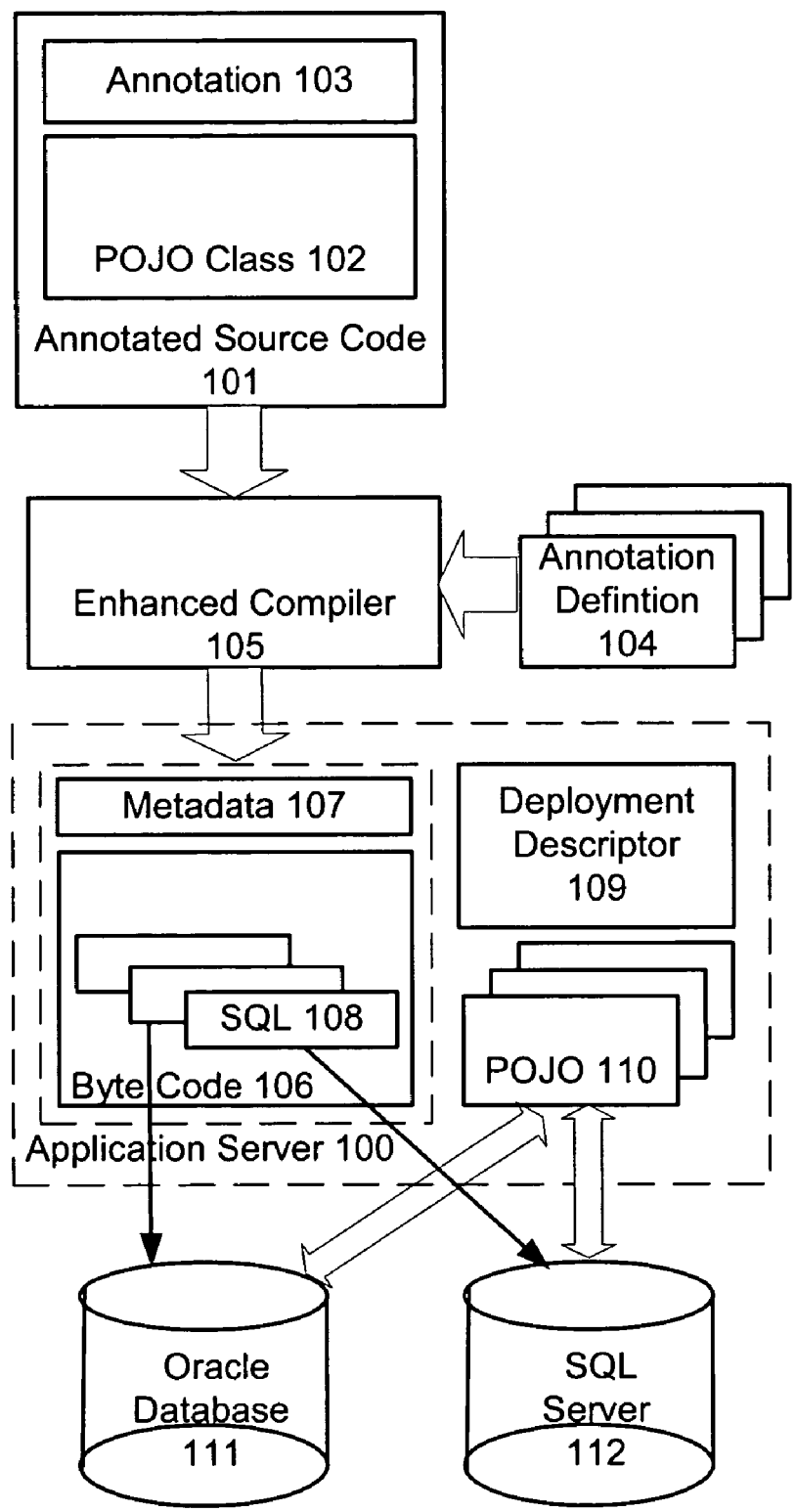
FIG. 1 is an illustration of an exemplary framework to retrieve and persist POJOs in accordance with one embodiment of the present invention.

FIG. 1 is an illustration of an exemplary framework to retrieve and persist POJOs implemented in accordance with one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, 101 is a file of annotated source code representing one or more POJO classes 102 defined in Java®. Each of the one or more POJO classes can be augmented with a proceeding annotation 103 defined in 104 in accordance with one embodiment of the invention to facilitate the persistence of the POJOs. The annotated source code, together with the definitions of related annotations, are provided to an enhanced compiler 105, which in addition to compiling Java® source code into executable bytecode 106 and associated metadata 107 on an application server 100, is enhanced to recognize annotations based on an extended syntax for the persistence between POJOs 110 of the class 102 and the corresponding table(s) in the underlying database 111 and 112. The bytecode may also include one or more statements of SQL 108 capable of querying the underlying database 111 and 112, mapping the matched data entities against the POJO class 102 and saving the generated POJOs via the annotation or a deployment descriptor 109. The deployment descriptor defines various features of the SQL, such as the underlying databases to be queried against, the query selection information (query statement), etc. It also defines how the matched data entities should be mapped to POJOs, as well as which columns in the data entities should be skipped from mapping. Each SQL statement can be applied to a specific type of database, such as an Oracle Database 111 or an SQL Server 112.

Figure 2:
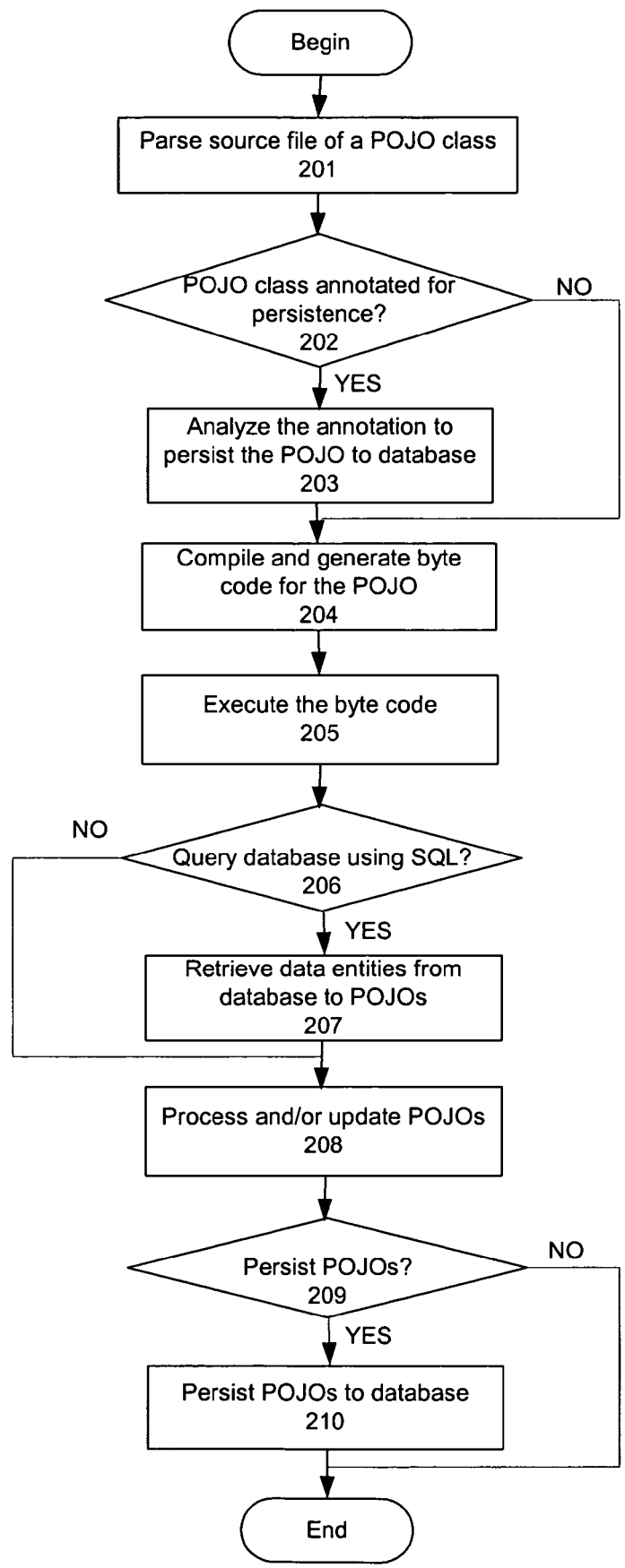
FIG. 2 is a flow chart of an exemplary POJO retrieval and persistence process in accordance with one embodiment of the invention.

FIG. 2 is a flow chart of an exemplary POJO retrieval and persistence process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, the enhanced compiler first reads the source code of a POJO class at step 201. Using any one of a number of parsing techniques known in the art at step 202, it identifies if the POJO class has been annotated for persistence. If so, the compiler will analyze the annotation for persistence, compile the annotated source code as well as the definitions of related annotations, and associate a meta-data extracted from the annotations with the compiled bytecode at step 203. If an annotation is not found, the compiler will proceed to compile and generate a bytecode for the POJO class at step 204. The bytecode can then be executed on the application server at step 205. If it is determined at step 206 that the bytecode uses SQL to query an underlying database, the bytecode will query the database based on the annotation or the specification in the deployment descriptor, and propagate matched data to generated POJOs at step 207. These POJOs may then be processed and/or updated at step 208. If POJO persistence is desired at step 209, these POJOs will be persisted to corresponding tables in the underlying database at step 210 based on the annotation and/or metadata for persistence.

In one embodiment, the retrieval of POJOs using SQL supports relationship caching, i.e., queries that cache POJOs of multiple related POJO classes of the current POJO class of interest, which improves the performance of the application server by loading related POJOs into the cache and avoiding multiple queries by issuing a join query for the related POJOs.

In one embodiment, the retrieval of POJOs using SQL supports the use of stored procedures, which are functional components previously generated and stored on the application server. Mapping information is associated with individual stored procedures—there is no reuse of mapping information in this case.

In one embodiment, the retrieval and persistence of POJOs using SQL supports the deployment against multiple types of databases by allowing developers to use database specific SQL in their queries. To this end, multiple SQL queries may be used in the bytecode, one for each target type of database. The target database type, and therefore the specific SQL query that is to be used, can be determined dynamically by the deployment descriptor.

In one embodiment, the retrieval of POJOs using SQL may utilize a SQL query that only loads primary key fields if so desired by the user by setting the "finders-load-bean" element in the deployment descriptor. When the element is set to false, the SQL query will execute against a particular database and ignore non-primary key columns if they are specified in the query.

In one embodiment, the retrieval of POJOs using SQL can be implemented using a piece of Java® code. The following Java® source code can be implemented to retrieve POJOs using SQL language:

QueryHome qh=(QueryHome)home;
Query q=qh.createQuery( );
q.setSqlCaching("AllOrderColumns");
Collection c=q.find("select name, street, city, zip from custTable where o.date='01-Dec-2003'");

In this scenario, the string argument passed to Query.find( ) is a SQL query. Calling the QueryProperties.setSqlCaching( ) method indicates that SQL is being used. A method QueryHome.getDatabaseType( ) can also be added that returns the specific type (Oracle, DB2, etc.) of the database to which the SQL is connected. The application can then use this method to create a database specific SQL.

In some embodiments, there are two possible strategies to solve the problem of mapping the information returned from the database into POJOs:

1. Parse the SQL query in order to determine exactly which columns are returned by the SQL query (the SELECT clause) and use the mapping information supplied in the deployment descriptor or the annotations (both are described below) to instantiate and hydrate (map the data from the database to) the POJOs.

2. Let the user create and hydrate the objects themselves.

Strategy 1) should cover most cases and strategy 2) could be used when the SQL query uses proprietary SQL extensions.

Strategy 1) provides for a simpler programming model for the users since they only have to provide minimal information. The drawback is that parsing the SQL query might not be 100% guaranteed in the following cases:

Presence of vendors extensions

Complex inner joins or unions.

New SQL not yet supported by the container (but understood by the JDBC driver).

In such a case, the user may switch to strategy 2), where the user could supply the implementation of a certain interface such as:

```
public interface IResultSetHandler {
    /**
     * @return The Java ® Bean to be populated.
     */
    public Object createObject( );
    /**
     * @param object The values contained in the ResultSet,
     * in the same order.
     */
    public void populateObject(Object object, Object[ ] values);
}
```

In this case, the user is in charge of creating and populating the objects.

In some embodiments, the retrieval of POJOs using SQL can be implemented using a deployment descriptor. The basic mapping information that users specify in the deployment descriptor will be common for all types of query languages used. For example, columns in a table in a database will still be mapped to fields in a POJO. Once users have done this, they are able to query the database without specifying any additional mapping information, and the query statements are automatically translated using the mapping information that was supplied. When they start using SQL directly, however, some additional mapping information is needed.

In some embodiments, the SQL selection information, e.g., an SQL statement, for both SQL queries and the stored procedures is specified in, e.g., an "sql" element in an element such as a "weblogic-rdbms-bean" in the deployment descriptor of the POJO, such as "weblogic-cmp-jar.xml". Selection information is specified at the bean level so that it may be reused in case there are multiple SQL query statements that can reuse the same selection information.

In some embodiments, the deployment descriptor "weblogic-cmp-jar.xml" needs to be updated by adding a sub-element, e.g., "sql-caching", to the "weblogic-rdbms-bean" element of "weblogic-cmp-jar.xml" to represent a single POJO class. An exemplary syntax of the updated "weblogic-rdbms-bean" element is as follows:

```
<!ELEMENT weblogic-rdbms-bean (
    POJO-name,
    data-source-name,
    table-map+,
    field-group*,
    relationship-caching*,
    sql-caching*,
    weblogic-query*,
    delay-database-insert-until?,
```

-continued

```
    use-select-for-update?,
    lock-order?,
    instance-lock-order?,
    automatic-key-generation?,
    check-exists-on-method?
)>
```

The "sql-caching" element is used to describe the format of the POJOs that are retrieved by an SQL query. An exemplary syntax of the "sql-caching" element is shown as follows:

```
<!ELEMENT sql-caching (
    description?,
    sql-caching-name,
    (POJO | result-column)+
)>
```

An element "sql-caching-name" that uniquely identifies an "sql-caching" element is associated with the formatting description so that the description can be specified once and reused when multiple SQL queries return data entities that map to the same class of POJO. An exemplary syntax of the "sql-caching-name" element is shown as follows:

```
<!ELEMENT sql-caching-name (#PCDATA)>
```

A matched data entity may contain contiguous sequences of columns that are mapped to a POJO, intermixed with columns that are not mapped to a POJO, like an aggregate column. A "result-column" element can be used to term columns that are not mapped to a POJO and are passed through to the user. It designates a column that is not mapped to a POJO, but instead appears as-is in the result returned to the bytecode. An exemplary syntax of "result-column" element looks as the following:

```
<!ELEMENT result-column EMPTY>
```

An "POJO" element describes a contiguous set of columns that are mapped to an POJO and optionally related POJOs. An exemplary syntax of the "POJO" element is shown as follows:

```
<!ELEMENT POJO (
    POJO-name,
    table+,
    sql-caching-element*
)>
```

The "table" element within the "POJO" element groups together a set of columns from a particular table. Primary key columns must be listed first. An exemplary syntax of the "table" element is shown as follows:

```
<!ELEMENT table (
    table-name,
    dbms-column+
)>
```

An "sql-caching-element" element within the "POJO" element is used to provide relationship caching functionality for SQL queries by mapping table columns to a related classes of POJOs. An exemplary syntax of the "sql-caching-element" element is shown as follows:

```
<!ELEMENT sql-caching-element (
    cmr-field,
    table+,
    sql-caching-element*
)>
```

In some embodiments, the "weblogic-query" element within the "weblogic-rdbms-bean" element of the deployment descriptor may also need to be modified in addition to the "sql-caching" element. A new element is added in the "weblogic query" element, an "sql-descriptor", to support the implementation of retrieving POJOs using SQL language. An exemplary syntax of the modified "weblogic-query" element is shown as follows:

```
<!ELEMENT weblogic-query (
    description?,
    query-method,
    (sql-descriptor)
    max-elements?,
    include-updates?,
    sql-select-distinct?
)>
```

The "sql-descriptor" element within the "weblogic-query" element is used when the POJOs are retrieved using the SQL language. It associates the WHERE clause of the query with the SELECT and FROM clauses. An exemplary syntax of the "sql-descriptor" element is shown as follows:

```
<!ELEMENT sql-descriptor (
    sql-caching-name,
    (database-type?, sql)+
)>
```

In some embodiments, compilation of the annotated source code by the enhanced compiler generates one or more files of bytecode involving POJOs that are executable, and/or deployment descriptors to facilitate the retrieval and/or persistence of POJOs. During the parsing of the annotated source code, the enhanced compiler identifies the POJO classes used in the code and attempts to locate definitions corresponding to each annotation provided in separate files. Once the compiler has compiled the annotated source code as well as the definitions of related annotations into bytecode, the bytecode is then provided to an execution engine such as the Java® Virtual Machine (JVM) that controls the execution of the code (on e.g. an application server), and performs conventional execution runtime services, such as memory allocation request and release, error/exception handling, and so forth. In addition, The compiler generates meta-data based on the annotated source code and associates it with the bytecode. The meta-data may include, for example, descriptions of the annotations, methods, member variables that are associated with the persistence of the POJOs.

In some embodiments, the following is an exemplary subset of annotations defined in Java® that can be used for POJO retrieval and persistence. These annotations are meant only for the purpose of illustration and are not intended to communicate limitations on the functionality or embodiments of the invention. The file names used in the following sections are also exemplary and could be used to identify the functionalities of each segment of source code.

@Persistent, which defines rules of persistence between a POJO class and a table in the underlying database.

@CmpField, which defines features related to container-managed persistent fields in the POJO class.

@Relation, which defines relations between more than one POJO classes and their corresponding tables in the database.

@CmrField, which defines features related to container-managed relations among POJO classes.

@RelationshipCachingElement, which allows the caching and persistence of POJOs of related classes of the current POJO class.

FIG. 3 illustrates an exemplary source code Persistent. Java® defining annotation @Persistent in accordance with one embodiment of the invention. As shown, 301 gets the name of the primary key. 302 gets the name of the table to which the POJO class is mapped, the default value of the name is "Unspecified". 303 specifies the rows in the table that should be checked when optimistic concurrency is used, and 304 specifies the column that holds the timestamp for optimistic concurrency. 305 defines the method used to validate the tables created by the EJB container, 306 defines the concurrency strategy for the POJO class as ReadOnly, Exclusive, Database, or Optimistic. 307 specifies how optimistic concurrency verifies that the columns have or have not been modified during transactions. 308 sets the transaction timeout (in seconds). 309 specifies the possible type of the underlying database, which can be, but is not limited to, DB2, Informix, Oracle, SQLServer, Sybase, PointBase, and SQLServer2000. 310 specifies whether dynamic queries are enabled, and 311 defines name of the column to be used for polymorphism, which will be discussed later.

FIG. 4 illustrates an exemplary source code CmpField. Java® defining annotation @CmpField in accordance with one embodiment of the invention. As shown, 401 specifies the column where this CMP field will be mapped to, and 402 specifies the table(s) where this field should be mapped to. 403 specifies the names of the groups to which this field belongs, separated by commas. 404 sets whether this field is part of the compound-primary key.

The following examples illustrate the use of source code annotation @Persistent and @CmpField together with a POJO class definition in a Java® file to persist POJOs to an underlying database. These examples are meant only for the purpose of illustration and are not intended to communicate limitations on the functionality or embodiments of the invention. The file names used in the following sections are also exemplary and could be used to identify the functionalities of each segment of source code.

In the following example, a POJO class named "Person" is defined, preceded by the @Persistent annotation indicating that the POJO class is mapped to a table named "PERSON" in the database. @CmpField preceding methods on the field of "lastName" defines that the field will be mapped to the column "LAST_NAME" in the table, which is also the primary key of the table.

```
import com.bea.ejb30.annotations.*;
/**
 * Defines a persistent class with one primary key column.
 */
@Persistent(
    tableName = "PERSON"
)
public class Person {
    private String m_lastName;
    @CmpField(
        columnName = "LAST_NAME",
        primaryKey = true
    )
    public String getLastName( ) {
        return m_lastName;
    }
}
```

In some embodiments, polymorphic POJOs, whose methods and fields can be overloaded and/or inherited with different meanings and usages under different contexts, can be persisted and retrieved by declaring a discriminator column to enable polymorphism. The container will automatically set the content of this column to store the information about the class of POJOs being persisted. The following example illustrates that fields in the class of "Employee" extended from the class of "Person" can be persisted to the corresponding columns in the table of "PERSON" by declaring the "discriminatorColumn".

```
@Persistent(
    tableName = "PERSON",
    discriminatorColumn = "DISCRIMINATOR"
)
public class Person {
// ...
@Persistent(
    tableName = "PERSON"
)
public class Employee extends Person {
    public String getCompany( ) {
        // ...
    }
}
```

Note that this model of inheritance has a few restrictions on the nullability of its columns, and also that POJO classes in a same hierarchy need to map to the same table. Once a POJO class has been declared polymorphic, queries can be made the usual way as follows:

```
Collection<Person> c = s.execute("SELECT * FROM PERSON");
for (Person p : c) {
    String firstName = p.geFirstName( );
    if (p instanceof Employee) {
        String company = ((Employee) p).getCompany( );
    }
}
```

Here is another example of a class using keys generated by the container, The value for automatic-key-generation is part of an enum type defined by the annotation type. In this particular case, we can imagine a simple scheme that selects the max of a given column and uses this generator to create keys.

The same algorithms supported by our EJB container today will be supported (Oracle generators, etc. . . . ) and possibly others (random, UUID, etc. . . . ).

```
/**
 * Defines a persistent class with one primary key column
 * which is generated by the container.
 */
@Persistent(
    tableName = "ASSIGNMENT",
    automaticKeyGeneration = Increment
)
public class Assignment {
    public Integer m_id;
    @CmpField(
        columnName = "ID",
        primaryKey = true
    )
    public Integer getId( ) {
        return m_ide;
    }
}
```

FIG. 5 illustrates an exemplary source code Relation.Java® defining annotation @Relation in accordance with one embodiment of the invention. As shown, 501 gets the name of the relationship, the same name is used on both ends of a relationship (note that this constraint applies to unidirectional relationships as well). 502 is needed only in a many-many relationship, and it must be the name of an existing table that will be used to hold the joint table containing the relationships. If a compound primary key is used, a set of corresponding foreign keys should be specified separated by a comma. 503 is needed only in a relationship having at least one "One Side". The non-One Side POJO must declare the column that it will use to store the primary key of its counterpart. 504 is the name of a table in the database that contains a foreign-key, and 505 is the name of a table that contains a primary-key. 506 specifies optional CMR (container-managed relation) field(s) where this relationship will be kept. If they are not present, the relationship is unidirectional; If they are present, the attribute fkColumns must be specified as well. 507 specifies the name of the target POJO class (as well as EJB) of this relationship, which is used to generate the role name. If not supplied, a unique string will be generated.

FIG. 6 illustrates an exemplary source code CmrField.Java® defining annotation @CmrField in accordance with one embodiment of the invention. As shown, 601 specifies the names of the POJO classes to which this field to keep a relation belongs, separated by commas.

The following example illustrates the use of source code annotation @Relation and @CmrField together with a POJO class definition in a Java® file to persist POJOs to an underlying database. This example is meant only for the purpose of illustration and is not intended to communicate limitations on the functionality or embodiments of the invention.

In the following example, a one-to-many relation "Band-Recordings" is declared between a band and its recordings. The relation is kept in Band type, while a "fk_band" is declared as foreign key in the Recording type.

```
@Relation(
    name = "Band-Recordings"
)
public class BandBean {
    public Collection<RecordingBean> getRecordings( ) { ... }
}
```

-continued

```
@Relation(
    name = "Band-Recordings",
    cmrField = band,
    fkColumns = new String[ ] {
        "fk_band"
    }
)
public class Recording {
    @CmrField
    public BandBean getBand( ) { ... }
}
```

FIG. 7 is an exemplary source code RelationshipCachingElement.Java® defining annotation @RelationshipCachingElement in accordance with one embodiment of the invention. As shown, 701 specifies the name of a relationship caching. 702 provides a comma-separated list of CMR field names, and 703 specifies the names of the groups to be loaded for the CMR field.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "type" is used in the embodiments of the systems and methods described above, it will be evident that such concept can be interchangeably used with equivalent concepts such as, method, class, interface, component, object model, and other suitable concepts. While the concept "object" is used in the embodiments of the systems and methods described above, it will be evident that such concept can be interchangeably used with equivalent concepts such as, instance, and other suitable concepts. While the concept "field" is used in the embodiments of the systems and methods described above, it will be evident that such concept can be interchangeably used with equivalent concepts such as, attribute, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system implemented using a computer to support Plain Old Java® Object persistence, comprising:
    an annotated source code that includes a source code of a more Plain Old Java® Object class augmented with a plurality of annotations;
    a plurality of annotation definitions, wherein each of the plurality of definitions defines one of the plurality of annotations, wherein the plurality of annotation definitions define
        persistence between the Plain Old Java® Object class and a table in a database including defining a plurality of methods to get names of primary key and database table to which the Plain Old Java® Object class is mapped at runtime and defining name of the column of the database table to be used for Java polymorphism feature;
        relations between two or more Plain Old Java® Object classes and their corresponding tables in the database; and
        caching and persistence of more Plain Old Java® Objects of one or more related classes of the more Plain Old Java® Object class, including name of a relationship caching, CMR (container-managed relation) fields to keep the relations and names of groups of the Plain Old Java® Object classes to be loaded for the CMR fields;
    an enhanced compiler capable of:
        parsing and recognizing each of the plurality of annotations in the annotated source code; and
        compiling the annotated source code and the plurality of annotation definitions into an executable bytecode; and
    said executable bytecode includes one or more query statements to persist a plurality of more Plain Old Java® Objects to the database via the plurality of annotations and a deployment descriptor that defines features of underlying databases and query statements.

2. The system according to claim 1, wherein:
    the annotated source code can be Java® source code.

3. The system according to claim 1, wherein:
    one of the plurality of annotation definitions can be in Java®.

4. The system according to claim 1, wherein:
    the enhanced compiler is further capable of generating a metadata capable of facilitating the persistence of the plurality of Plain Old Java® Objects.

5. The system according to claim 1, wherein:
    the database can be one of: a DB2, an Informix Database, an Oracle Database, an SQL Server, a Sybase Database, a Point Base, and an SQL Server2000.

6. A method to support Plain Old Java® Object persistence, comprising:
    augmenting a source code of a more Plain Old Java® Object class with a plurality of annotations;

defining each of the plurality of annotations via one of a plurality of annotation definitions, wherein the plurality of annotation definitions define persistence between the more Plain Old Java® Object class and a table in a database including defining a plurality of methods to get names of primary key and database table to which the Plain Old Java® Object class is mapped at runtime and defining name of the column of the database table to be used for Java polymorphism feature;

relations between two or more Plain Old Java® Objects and their corresponding tables in the database; and caching and persistence of more Plain Old Java® Objects of one or more related classes of the Plain Old Java® Object class, including name of a relationship caching, CMR (container-managed relation) fields to keep the relations and names of groups of the Plain Old Java® Object classes to be loaded for the CMR fields;

parsing and recognizing each of the plurality of annotations in the annotated source code;

compiling the annotated source code and the plurality of annotation definitions into an executable bytecode that includes one or more query statements to persist a plurality of more Plain Old Java® Objects to the database via the plurality of annotations and a deployment descriptor that defines features of underlying databases and query statements.

7. The method according to claim 6, further comprising:
generating a metadata capable of facilitating the persistence of the plurality of Plain Old Java® Objects.

8. A machine readable medium having instructions stored thereon that when executed cause a system to:

augment a source code of a Plain Old Java® Object class with a plurality of annotations;

define each of the plurality of annotations via one of a plurality of annotation definitions, wherein the plurality of annotation definitions define persistence between the Plain Old Java® Object class and a table in a database, including defining a plurality of methods to get names of primary key and database table to which the Plain Old Java® Object class is mapped at runtime and defining name of the column of the database table to be used for Java polymorphism feature;

relations between two or more Plain Old Java® Object classes and their corresponding tables in the database; and caching and persistence of Plain Old Java® Objects of one or more related classes of the Plain Old Java® Object class, including name of a relationship caching, CMR (container-managed relation) fields to keep the relations and names of groups of the Plain Old Java® Object classes to be loaded for the CMR fields;

parse and recognize each of the plurality of annotations in the annotated source code;

compile the annotated source code and the plurality of annotation definitions into an executable bytecode that includes one or more query statements to persist a plurality of Plain Old Java® Object to the database via the plurality of annotations and a deployment descriptor that defines features of underlying databases and query statements.

9. The machine readable medium of claim 8, further comprising instructions that when executed cause the system to:
generate a metadata capable of facilitating the persistence of the plurality of Plain Old Java® Object.

10. A system implemented using a computer to support Plain Old Java® Object persistence, comprising:

means for augmenting a source code of a Plain Old Java® Object class a plurality of annotations;

means for defining each of the plurality of annotations via one of a plurality of annotation definitions, wherein the plurality of annotation definitions define persistence between the Plain Old Java® Object class and a table in a database, including defining a plurality of methods to get names of primary key and database table to which the Plain Old Java® Object class is mapped at runtime and defining name of the column of the database table to be used for Java polymorphism feature;

relations between two or more Plain Old Java® Object classes and their corresponding tables in the database; and caching and persistence of Plain Old Java® Objects of one or more related classes of Plain Old Java® Object class, including name of a relationship caching, CMR (container-managed relation) fields to keep the relations and names of groups of the Plain Old Java® Object classes to be loaded for the CMR fields;

means for parsing and recognizing each of the plurality of annotations in the annotated source code;

means for compiling the annotated source code and the plurality of annotation definitions into an executable bytecode that includes one or more query statements to persist a plurality of Plain Old Java® Objects to the database via the plurality of annotations and a deployment descriptor that defines features of underlying databases and query statements.

* * * * *

UNITED STATES PATENT AND TRADEMARK OFFICE
CERTIFICATE OF CORRECTION

PATENT NO. : 7,546,579 B2  
APPLICATION NO. : 10/927336  
DATED : June 9, 2009  
INVENTOR(S) : Cedric Beust Page 1 of 1

It is certified that error appears in the above-identified patent and that said Letters Patent is hereby corrected as shown below:

Title Page at (*) Notice: 655 days should be 548 days.

Signed and Sealed this

Eighth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,546,579 B2 | Page 1 of 1 |
| APPLICATION NO. | : 10/927336 | |
| DATED | : June 9, 2009 | |
| INVENTOR(S) | : Cedric Beust | |

It is certified that error appears in the above-identified patent and that said Letters Patent is hereby corrected as shown below:

In column 2, line 43, after "invention" insert -- . --.

In column 2, line 52, after "invention" insert -- . --.

In column 7, line 57, after "addition," delete "The" and insert -- the --, therefor.

In column 12, line 16, before "Plain" delete "more".

In column 12, line 32, before "Plain" delete "more".

In column 12, line 33, after "the" delete "more".

In column 12, line 46, before "Plain" delete "more".

In column 12, line 66, before "Plain" delete "more".

In column 13, line 4, in claim 6, before "Plain" delete "more".

In column 13, line 11, delete "Objects" and insert -- Object classes --, therefor.

In column 13, line 13, before "Plain" delete "more".

In column 13, line 25, before "Plain" delete "more".

In column 14, line 9, delete "Object" and insert -- Objects --, therefor.

In column 14, line 20, after "class" insert -- with --.

In column 14, line 35, after "of" insert -- the --.

Signed and Sealed this

Twenty-ninth Day of June, 2010

David J. Kappos
*Director of the United States Patent and Trademark Office*